United States Patent [19]

Isley

[11] 4,390,652

[45] Jun. 28, 1983

[54] NITRILE BARRIER RESINS CONTAINING FILLERS AND PROCESSING AIDS

[75] Inventor: Ralph E. Isley, Northfield, Ohio

[73] Assignee: Standard Oil Company, Cleveland, Ohio

[21] Appl. No.: 267,154

[22] Filed: May 26, 1981

[51] Int. Cl.³ .............................................. C08K 5/15
[52] U.S. Cl. .................................... 524/322; 524/300; 524/425; 524/449; 524/451; 524/535; 524/565; 525/285; 525/310
[58] Field of Search ........................ 525/310, 285, 5; 260/37 N, 31.2 N, 23.5 R; 524/322, 300, 535, 565

[56] References Cited

U.S. PATENT DOCUMENTS

| | | | |
|---|---|---|---|
| 3,426,102 | 2/1969 | Solak et al. | 260/29.7 N |
| 3,586,737 | 6/1971 | Duke et al. | 525/292 |
| 3,725,332 | 4/1973 | Carrock | 260/31.8 DR |
| 4,000,106 | 12/1976 | Isley | 260/31.8 DR |
| 4,151,151 | 4/1979 | Isley | 525/310 |
| 4,191,670 | 3/1980 | Strauch et al. | 524/322 |
| 4,292,228 | 9/1981 | Isley | 260/31.8 DR |

*Primary Examiner*—Ronald W. Griffin
*Attorney, Agent, or Firm*—William D. Mooney; Herbert D. Knudsen; Larry W. Evans

[57] ABSTRACT

The physical properties of a nitrile barrier resin, particularly the tensile modulus, heat distortion temperature and processability, are improved by including therein a carboxylic acid processing aid and an alkaline filler material.

16 Claims, No Drawings

NITRILE BARRIER RESINS CONTAINING FILLERS AND PROCESSING AIDS

BACKGROUND OF THE INVENTION

This invention relates to a polymer composition comprising a mixture of a nitrile barrier resin, a carboxylic acid and an alkaline filler and a process for preparing such compositions.

Thermoplastic nitrile barrier resins are well known in the art and have been described in U.S. Pat. Nos. 3,426,102 and 3,586,737. These nitrile resins are known to have desirable properties including gas barrier properties, impact resistance and chemical resistance. However, when these resins contain large amounts of fillers, they become very difficult to process. It has now been discovered that nitrile barrier resins which contain carboxylic acid processing aids and alkaline fillers can be easily processed and possess unexpectedly higher heat distortion temperatures and tensile moduluses.

SUMMARY OF THE INVENTION

This invention relates to a composition comprising a blend of (1) a copolymer produced by the polymerization of a major proportion of a monounsaturated nitrile, a minor proportion of another monovinyl monomer component copolymerizable therewith optionally in the presence of a preformed diene rubber; (2) a carboxylic acid; and (3) an alkaline filler. Preferred blends comprise (1) a rubber modified acrylonitrile-acrylate copolymer; (2) a carboxylic acid having at least 6 carbon atoms; and (3) a filler having a pH between 7.5 and 10.

DETAILED DESCRIPTION

Nitrile barrier resins are prepared by polymerizing a major proportion of a monounsaturated nitrile, such as acrylonitrile, and a minor proportion of another monovinyl monomer component copolymizable with said nitrile, optionally in the presence of a diene rubber which may be a homopolymer or a copolymer of a conjugated diene monomer.

The monounsaturated nitriles most useful in the present invention are the alpha, beta-olefinically unsaturated mononitriles having the structure:

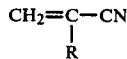

wherein R is hydrogen, a lower alkyl group having from 1 to 4 carbon atoms or a halogen. Such compounds include acrylonitrile, alpha-chloroacrylonitrile, alpha-fluoroacrylonitrile, methacrylonitrile, ethacrylonitrile and the like. The most preferred monounsaturated nitriles are acrylonitrile and methacrylonitrile.

The monovinyl monomer component copolymerizable with the monounsaturated nitrile includes one or more of the esters of olefinically unsaturated carboxylic acids, vinyl esters, vinyl ethers, vinyl ketones, alpha-olefines, vinyl aromatic monomers and others.

The esters of olefinically unsaturated carboxylic acids include those having the structure:

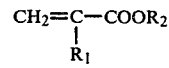

wherein $R_1$ is hydrogen, an alkyl group having from 1 to 30 carbon atoms or a halogen, and $R_2$ is an alkyl group having from 1 to 6 carbon atoms. Compounds of this type include methyl acrylate, ethyl acrylate, propyl acrylate, butyl acrylate, amyl acrylate, hexyl acrylate, methyl methacrylate, ethyl methacrylate, propyl methacrylate, butyl methacrylate, amyl methacrylate, hexyl methacrylate, methyl alpha-chloroacrylate, ethyl alpha-chloroacrylate and the like. Most preferred are methyl acrylate, ethyl acrylate, methyl methacrylate and ethyl methacrylate.

The alpha-olefins useful in the present invention include those having at least 4 or as many 10 carbon atoms and having the structure:

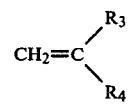

wherein $R_3$ and $R_4$ are alkyl groups having from 1 to 7 carbon atoms, and more specifically isobutylene, 2-methyl butene-1, 2-methyl pentene-1, 2-methyl hexene-1, 2-methyl heptene-1, 2-methyl octene-1, 2-ethyl butene-1, 2-propyl pentene-1 and the like. Most preferred is isobutylene.

The vinyl ethers include methyl vinyl ether, ethyl vinyl ether, propyl vinyl ether, butyl vinyl ether, methyl isopropenyl ether and the like. Most preferred are methyl vinyl ether, ethyl vinyl ether, propyl vinyl ether and butyl vinyl ether.

The vinyl esters include vinyl acetate, vinyl propionate, vinyl butyrate and the like. Most preferred is vinyl acetate.

The vinyl aromatic monomers include styrene, alphamethylstyrene, vinyl toluene, vinyl xylene, indene and the like. Most preferred are styrene and indene.

As discussed above, the instant polymeric system may optionally include a preformed diene rubber which can be a homopolymer or copolymer of a conjugated diene monomer. The conjugated diene monomers useful in the present invention include butadiene-1,3, isoprene, chloroprene, bromoprene, cyanoprene, 2,3-dimethyl butadiene-1,3, 2-ethyl butadiene-1,3, 2,3-diethyl butadiene-1,3 and the like. Most preferred for the purposes of this invention are butadiene-1,3 and isoprene because of their ready availability and their excellant polymerization properties. These conjugated diene monomer can be copolymerized with the monovinyl monomer components described above. Preferred monovinyl monomers useful with these diene monomers are selected from the group consisting of acrylonitrile, alkyl acrylate or styrene.

Preferably, the nitrile barrier resin used in this invention is prepared by the polymerization of 100 part by weight of (A) from 60 to 90% of:

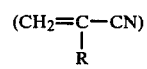

wherein R has the forgoing designation, and (B) from 10 to 40% by weight based on the combined weights of (A) and (B) of at least one member selected from the group consisting of (1) a vinyl aromatic monomer; (2) an ester having the structure:

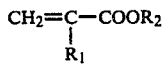

wherein $R_1$ and $R_2$ have the foregoing respective designation; (3) an alpha olefine having the structure:

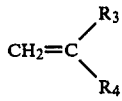

wherein $R_3$ and $R_4$ have the forgoing respective designations; (4) a vinyl ether; and (5) a vinyl ester. These nitrile copolymers are polymerized in the presence of from 0 to 40 parts by weight of (C) a rubbery copolymer of a conjugated diene monomer selected from the group consisting of butadiene and isoprene and optionally at least one comonomer selected from the group consisting of styrene, a nitrile monomer having the structure:

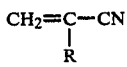

wherein R has a forgoing designation, and an ester having the structure:

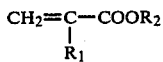

wherein $R_1$ and $R_2$ have the foregoing respective designations, said rubbery polymer containing from 50 to 100% by weight of polymerized conjugated diene and from 0 to 50% by weight of a comonomer.

More preferred nitrile barrier resins ar preparred by the polymerization of at least 70 parts by weight of (A) and less than 30 parts by weight of (B) in the presence of between 5 and 25 parts by weight of (C).

The nitrile barrier resins can be prepared by any of the known general techniques for polymerization including the bulk polymerization, solution polymerization and emulsion or suspension polymerization techniques by batch, continuous or intermittent addition of the monomers and other components. The preferred method is emulsion polymerization. This type polymerization is normally carried out in an aqueous medium in the presence of an emulsifier and a free radical generating polymerization initiater at a temperature of from 0° to 100° C. in the substantial absence of molecular oxygen.

The alkaline fillers useful in this invention comprise alkaline fillers, i.e. fillers having a pH greater than 7.0, which contain a polyvalent cation. The pH of the filler is normally in the range of 7 to 12 since higher pH's may have a deleterious effect on resin properties. The polyvalent cation is preferably selected from Group IIA of the Periodic Table and more preferably comprises magnesium and/or calcium.

Fillers which are useful include talc, mica, calcium carbonate and wollastonite. These fillers are present in the blend in amounts of at least 10 parts of filler to 100 parts of nitrile barrier resin. Especially good resins contain at least 25 parts, preferably at least 50 parts, of filler per 100 parts of barrier resin. It is also possible with this invention to achieve filler levels of greater than 100 parts of filler per 100 parts of barrier resin.

The carboxylic acids which are useful in this invention include those with the following structure:

R—COOH wherein R is a monovalent radical. Examples of the carboxylic acids include isobutyric acid, stearic acid, caprylic acid, capric acid, pelargonic acid, lauric acid, oleic acid and the like. Preferrred carboxylic acids are $C_8$ to $C_{18}$ aliphatic acids and more preferred are $C_{12}$ to $C_{18}$ saturated aliphatic acids. The acid is present in the polymeric blend in amounts of at least 1 part per 100 parts of nitrile barrier resin. Preferably, between 2 and 25, and more preferably between 4 and 15, parts of acid are present for every 100 parts of resin. Generally, the higher the level of acid the greater the processability of the resin.

The polymeric blends of the invention can also contain an acid anhydride. The addition of this acid anhydride improves the processability of the resin. Examples of these acid anhydrides include glutaric anhydride, 1,2,4-benzene tricarboxylic anhydride, 1,2,4,5-benzene tetra carboxylic anhydride, maleic anhydride, phthalic anhydride, succinic anhydride, tetra chloro phthalic anhydride, tetra bromo phthalic anhydride, dichloro maleic anhydride and the like. These anhydrides are present in the polymeric blend in amounts between 0 and 35 parts per 100 parts of nitrile barrier resin.

The fillers and acids can be dispersed in the nitrile barrier resin in any one of a number of ways which are well known to those skilled in the art. The blends can be made in an extruder, an internal mixer such as a Banbury or a Brabender, or blends can be made by adding the filler and acid to the polymer latex. Blends can also be made by adding the filler and acid to the powdered, oil-granular resin in a high speed mixer.

The compositions produced by following the disclosure of the present invention are useful thermoplastic materials which can be modified into containers, pipes, rods, films, sheets, fibers, and the like, to be used for packaging, storing and transporting solids, liquids and gases of various types.

SPECIFIC EMBODIMENTS

This invention is further illustrated in the following examples wherein the amounts of ingredients are expressed in parts by weight. Unless otherwise indicated, the carboxylic acid used in these examples is Emersol 6320 which is a blend of $C_{12}$ to $C_{18}$ fatty acids, primarily comprising stearic acid.

Comparative Example A

A. A rubber latex is prepared by polymerizing with continuous agitation at 45° C. in the substantial absence of molecular oxygen a mixture of the following ingredients:

| Ingredient | Parts |
|---|---|
| Acrylonitrile | 30 |
| Butadiene-1,3 | 70 |
| Emulsifier (Gafac RE-610)* | 2.4 |

| Ingredient | Parts |
|---|---|
| Azobisisobutyronitrile | 0.3 |
| t-dodecyl mercaptan | 0.5 |
| Water | 200 |

*A mixture of R—O—(CH$_2$CH$_2$O)$_n$PO$_3$M$_2$ and [R—O—(CH$_2$CH$_2$O)$_n$]$_2$PO$_2$M wherein n is a number from 1 to 40, R is an alkyl or aralkyl group and preferably a nonyl phenyl group, and M is hydrogen, ammonia or an alkaline metal, which composition is sold by GAF Corporation.

Before the reaction was started, the pH of the mixture was adjusted to about 8 with KOH. The polymerization was carried out for 22½ hours to a conversion of about 92% and a total solids content of about 33.1%.

B. An impact resistant gas barrier resin was prepared by polymerization of a mixture of the following ingredients:

| Ingredient | Parts |
|---|---|
| Acrylonitrile | 75 |
| Methyl acrylate | 25 |
| Rubber solids in the form of latex A (above) | 9 |
| Potassium persulfate | 0.06 |
| Emulsifier (Gafac RE-610) | 3 |
| Modifier (n-dodecyl mercaptan) | 1 |
| Water | 200 |

The pH was adjusted to about 7 with NaOH. The polymerization was carried in the substantial absence of oxygen at 60° C. for 5 hours to produce a 91% conversion. The resulting latex was coagulated and the recovered resin was dried. The resin was compression molded in a ⅛ inch thick sheet mold at 320° F. and cooled. Samples cut from this sheet were tested and found to have an ASTM tensile modulus of 501,000 psi and an ASTM heat distortion temperature at a 264 psi stress of 68° C. The melt flow of this polymer was tested in a Monsanto Rheometer at 428° F. The melt flow was determined to be 54.79 per 10 minutes.

Comparative Example B

A formulation consisting of the following was weighed out:

| Ingredient | Parts |
|---|---|
| Resin of Comparative Example A | 100 |
| Tetrachloro phthalic anhydride | 10 |
| Muscovite mica (#88 Waterground mica-Franklin Mineral Products Co.) | 120 |
| Carboxylic acid | 4 |

This formulation was charged into an internal mixture heated to 235° C. and run for five minutes at a rotor speed of 35 rpm. The product was then compression molded in a ⅛ inch sheet mold at 320° F. and cooled. Samples cut from this sheet were tested and found to have a tensile modulus of 2,090,000 and a heat distortion temperature of 80° C. The melt flow was determined to be 0 g per 10 minutes.

Comparative Example C

The procedure of Comparative Example B was used employing the following formulation:

| Ingredient | Parts |
|---|---|
| Resin of Comparative Example A | 100 |
| Tetrachloro phthalic anhydride | 10 |
| Anhydrous clay (AL-SIL-ATE W-D.A. Campbell Co.) | 125 |
| Carboxylic Acid | 4 |

This resin blend was found to have a tensile modulus of 1,370,000 psi and a heat distortion temperature of 74° C. The melt flow was determined to be 0 g per 10 minutes.

Comparative Example D

The procedure of Comparative Example B was used employing the following formulation:

| Ingredient | Parts |
|---|---|
| Resin of Comparative Example A | 100 |
| Tetrachloro phthalic anhydride | 10 |
| Talc (Talcron CP44-31- Minerals, Pigments and Metal Division of Pfizer, Inc.) | 120 |
| Calcium stearate | 4 |

The resulting blend was found to have a tensile modulus of 1,520,000 psi and a heat distortion temperature of 75° C. The melt flow was determined to be 0 g per 10 minutes.

Comparative Example E

The procedure of Comparative Example B was repeated using the following formulation:

| Ingredient | Parts |
|---|---|
| Resin of Comparative Example A | 100 |
| Talc (4725 Polytal-Whittacre, Clark and Daniels, Inc.) | 50 |

The resulting polymeric blend had a tensile modulus of 1,270,000 psi and a heat distortion temperature of 80° C. The melt flow was 13.7 gms per 10 minutes.

EXAMPLES 1 to 4

The procedure of Comparative Example B was used employing 100 parts of the resin of Comparative Example A and various amounts of fillers and acid. No acid anhydride was used in these examples. The amount of filler and acid and the various physical properties of the resultant blend are shown in Table 1.

TABLE 1

| Example | Filler Type | Filler | Acid | Anhydride | Melt Flow (g/10 min.) | Tensile Modulus (psi × $10^5$) | Heat Distort Temperature (264 psi, °C.) |
|---|---|---|---|---|---|---|---|
| 1 | Talc (4725 Polytal) | 120 | 8 | 0 | 57.0 | 13.0 | 79 |
| 2 | Phlogopite Mica (Suzorite 150-S-Marietta Resources International Ltd.) | 120 | 4 | 0 | 3.1 | 29.2 | 84 |
| 3 | Phlogopite Mica (Suzorite 150-S) | 120 | 8 | 0 | 2.0 | 27.4 | 83 |
| 4 | Phlogopite Mica (Suzorite 150-S) | 120 | 12 | 0 | 15.4 | 17.5 | 79 |

EXAMPLES 5 to 17

The procedure of Comparative Example B was used employing a formulation comprising 100 parts of the resin of Comparative Example A and various amounts of fillers, acid and tetra chloro phthalic anhydride. The results are shown in Table 2.

TABLE 2

| Example | Filler Type | Filler | Acid | Anhydride | Melt Flow (g/10 min.) | Tensile Modulus (psi × $10^5$) | Heat Distort Temperature (264 psi, °C.) |
|---|---|---|---|---|---|---|---|
| 5 | Phlogopite Mica (Suzorite 60-S) | 120 | 4 | 10 | 7.3 | 24.1 | 80 |
| 6 | Phlogopite Mica (Suzorite 120-S) | 120 | 4 | 10 | 12.4 | 20.9 | 81 |
| 7 | Wollastonite (Nyad 325)[1] | 120 | 4 | 10 | 6.7 | 11.6 | 71 |
| 8 | Wollastonite (Nyad G)[1] | 120 | 4 | 10 | 21.4 | 11.2 | 71 |
| 9 | Talc (4545 White Polytal)[2] | 120 | 4 | 10 | 20.4 | 16.5 | 77 |
| 10 | Talc (4641 Polytal)[2] | 120 | 4 | 10 | 14.1 | 13.8 | 73 |
| 11 | Talc (4725 Polytal) | 120 | 4 | 10 | 14.7 | 16.9 | 78 |
| 12 | Talc (Talcron CP44-31) | 120 | 4 | 10 | 10.3 | 16.0 | 77 |
| 13 | Talc (Talcron CP44-31) | 120 | 3 | 15 | 3.6 | 17.2 | 78 |
| 14 | Calcium Carbonate (Vicron 15-15)[3] | 120 | 4 | 10 | 6.1 | 6.3 | 67 |
| 15 | Calcium Carbonate (Vicron 15-15) | 120 | 8 | 10 | 65.2 | 7.8 | 61 |
| 16 | Calcium Carbonate (Albaglos)[3] | 120 | 8 | 10 | 4.2 | 7.4 | 58 |
| 17 | Calcium Carbonate (Albaglos) | 120 | 12 | 10 | 114.1 | 5.0 | 57 |

[1] NYCO Division of Processed Minerals, Inc.
[2] Whittacre, Clark and Daniels, Inc.
[3] Minerals, Pigments and Metals Division of Pfizer, Inc.

EXAMPLES 18 to 24

The procedure of Comparative Example B was used employing a formulation comprising 100 parts of the resin of Comparative Example A and various amounts of fillers, acid and tetra chloro phthalic anhydride. The results are shown in Table 3.

EXAMPLE 25 The procedure of Comparative Example B was repeated with the following formulation:

| Ingredient | Parts |
|---|---|
| Resin of Comparative Example A | 100 |
| Emery 658 (50% Caprylic acid, 44% Capric acid) | 4 |
| Talc (4725 Polytal) | 50 |

The resulting blend was found to have a tensil modulus of 1,360,000 and a heat distortion temperature of 75° C. The melt flow of the blend was determined to be 20.4 gms per 10 minutes.

TABLE 3

| Example | Filler Type | Filler | Acid | Anhydride | Melt Flow (g/10 min.) | Tensile Modulus (psi × $10^5$) | Heat Distort Temperature (264 psi, °C.) |
|---|---|---|---|---|---|---|---|
| 18 | Phlogopite Mica (Suzorite 150-S) | 40 | 3 | 7 | 40.3 | 15.1 | 76 |
| 19 | Phlogopite Mica (Suzonite 325 HK) | 30 | 3 | 5 | 35.1 | 10.1 | 74 |
| 20 | Talc (4545 Polytal) | 50 | 3 | 7 | 36.0 | 9.6 | 76 |
| 21 | Talc (4725 Polytal) | 50 | 4 | 7 | 44.1 | 11.5 | 77 |
| 22 | Talc (4725 Polytal) | 40 | 3 | 7 | 50.7 | 9.7 | 76 |
| 23 | Calcium Carbonate (Albaglos) | 30 | 2 | 5 | 44.2 | 8.0 | 71 |
| 24 | Calcium Carbonate (Albaglos) | 30 | 3 | 5 | 22.8 | 11.3 | 76 |

EXAMPLE 26

The procedure of Comparative Example B was repeated with the following formulation:

| Ingredient | Parts |
|---|---|
| Resin of Comparative Example A | 100 |
| Isobutyric Acid | 4 |
| Talc (4725 Polytal) | 50 |

The resulting polymer blend had a tensile modulus of 1,410,000 psi and a heat distortion temperature of 76° C. The melt flow was 19.01 gms per 10 minutes.

It is apparent from the above examples that as the amount of filler in the polymer blend increases, the tensil modulus and heat distortion temperature also increase but the processability (melt flow) decreases. Increasing the amount of acid in the blend results in increased processability but decreasing tensile modulus and heat distortion temperature. Each resin/filler/acid blend will need to be optimized depending on which properties are the most important for the desired end use.

Although only a few embodiments of this invention have been specifically described above, it should be appreciated that many additions and modifications can be made without departing from the spirit and scope of the invention. These and all other modifications are intended to be included within the scope of this invention, which is to be limited only by the following claims:

We claim:

1. A composition which comprises a blend of (1) a copolymer produced by the polymerization of a major proportion of a mono-unsaturated nitrile and a minor proportion of another monovinyl monomer component polymerizable therewith; (2) an aliphatic carboxylic acid with 18 or less carbon atoms; and (3) an alkaline filler containing a polyvalent cation.

2. The composition of claim 1 wherein the copolymer is produced by the polymerization of, based on 100 parts of copolymer;

(A) from 60 to 90 percent by weight of at least one nitrile having the structure:

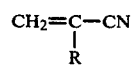

wherein R is hydrogen, a lower alkyl group having from 1 to 4 carbon atoms or a halogen, and (B) from 10 to 40 percent by weight based on the combined weights of (A) and (B) of at least one member selected from the group consisting of (1) an ester having the structure:

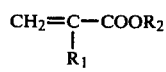

wherein $R_1$ is hydrogen, an alkylgroup having from 1 to 30 carbon atoms or a halogen and $R_2$ is an alkyl group having from 1 to 6 carbon atoms, (2) an alpha olefin having the structure:

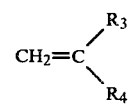

wherein $R_3$ and $R_4$ are alkyl groups having from 1 to 7 carbon atoms, (3) a vinyl ether, (4) vinyl ester, and (5) a vinyl aromatic, in the presence of from 0 to 40 parts by weight of (C) a rubbery polymer of a conjugated diene monomer and a comonomer selected from the group consisting of styrene, a nitrile monomer having the structure:

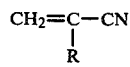

wherein R has a foregoing designation, and an ester having the structure:

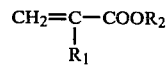

wherein $R_1$ and $R_2$ have the foregoing respective designations, said rubbery polymer containing from 50 to 100 percent by weight of polymerized conjugated diene and from 0 to 50 percent by weight of comonomer.

3. The composition of claim 2 wherein (A) is acrylonitrile.

4. The composition of claim 2 wherein (B) is methyl acrylate.

5. The composition of claim 2 wherein (B) is styrene.

6. The composition of claim 2 wherein (C) is 1 to 40.

7. The composition of claim 1 wherein the blend also includes an anhydride.

8. The composition of claim 1 wherein the carboxylic acid is a $C_4$ to $C_{18}$ aliphatic acid.

9. The composition of claim 1 wherein the carboxylic acid is a $C_8$ to $C_{18}$ saturated aliphatic acid.

10. The composition of claim 1 wherein the carboxylic acid is a $C_{12}$ to $C_{18}$ saturated aliphatic acid.

11. The composition of claim 1 wherein the polyvalent cation is selected from Group IIA of the Periodic Table.

12. The composition of claim 11 wherein the cation is selected from the group consisting of magnesium and calcium.

13. The composition of claim 1 wherein the filler has a pH between 7.5 and 10.

14. A process for preparing a polymer composition comprising blending (1) a copolymer produced by the polymerization of a major proportion of a mono-unsaturated nitrile and a minor proportion of another monovinyl monomer component polymerizable therewith; (2) an aliphatic carboxylic acid with 18 or less carbon atoms; and (3) an alkaline filler containing a polyvalent cation.

15. The composition of claim 1 wherein the copolymer is produced in the presence of a preformed diene rubber.

16. The process of claim 14 wherein the copolymer is produced in the presence of a preformed diene rubber.

* * * * *